United States Patent [19]

Kurotobi et al.

[11] Patent Number: 5,513,794
[45] Date of Patent: May 7, 1996

[54] METHOD FOR FIXING STOPPER RING TO PIPE SPIGOT

[75] Inventors: Manabu Kurotobi; Mutsuo Uchida, both of Amagasaki, Japan

[73] Assignee: Kubota Corporation, Japan

[21] Appl. No.: 342,597

[22] Filed: Nov. 21, 1994

[30] Foreign Application Priority Data

Dec. 8, 1993 [JP] Japan .................................. 5-308097

[51] Int. Cl.$^6$ .......................... B23K 31/02; B23K 103/06
[52] U.S. Cl. ............................ 228/262.45; 228/262.42; 228/169; 228/135; 148/529; 29/890.141
[58] Field of Search ................................. 228/135, 169, 228/262.42, 262.45; 148/519, 529; 29/237, 450, 282, 890.141, 890.14

[56] References Cited

U.S. PATENT DOCUMENTS 4,815,947  3/1989  Okoma et al. ............... 228/262.45
4,902,358  2/1990  Napier et al. ..................... 148/528

Primary Examiner—Samuel M. Heinrich
Attorney, Agent, or Firm—D. Peter Hochberg; Mark Kusner; Michael Jaffe

[57] ABSTRACT

A method for fixing a stopper ring to the outer periphery of the spigot of a cast iron pipe for preventing separation of the pipe from another pipe. A single or plural annular grooves are formed on the inner periphery of the stopper ring, and a brazing filler material is fitted in the annular groove. The stopper ring with the annular groove in which is fitted the brazing filler material is fitted on the spigot of the pipe. Subsequently, the pipe is ferritically annealed and the stopper ring is simultaneously brazed to the spigot by the heat of annealing.

6 Claims, 4 Drawing Sheets

METHOD FOR FIXING STOPPER RING TO PIPE SPIGOT

FIELD OF THE INVENTION

This invention relates to a method for fixing a stopper ring to the outer periphery of the spigot of a cast iron pipe for preventing separation of the pipe from another.

BACKGROUND OF THE INVENTION

Cast iron pipes are known which are of the type having a stopper ring fixed to the outer periphery of the spigot of the pipe for preventing separation of the pipe from another, the stopper ring being made of steel or tough cast iron (e.g., ductile cast iron). The stopper ring is engageable with a lock ring fitted in a groove formed on the inner periphery of the socket of a mating pipe so that the socket and the spigot are prevented from separating from each other.

Typically, such a known stopper ring is formed as having a circumferentially one-point split configuration and is externally fitted in a groove formed in the outer periphery of the spigot, being then fixed to position by welding. After being so fixed, the stopper ring may be subjected to machining to thereby provide a surface for contact with a socket-side lock ring.

However, this prior art practice involves considerable working complexity, because the outer periphery of the spigot need to be formed with a groove and because welding is required. Furthermore, when machining is effected as above noted, a part of the weld is removed to provide a margin for machining, which may result in strength insufficiency.

DISCLOSURE OF THE INVENTION

The object of this invention is to provide a method for fixing a stopper ring to the spigot of a cast iron pipe which eliminates the need for the outer periphery of the pipe spigot being machined for groove cutting, as well as for welding, and which provides for high strength joining.

In order to accomplish this object, the method for fixing a stopper ring to the outer periphery of the spigot of a cast iron pipe in accordance with the invention comprises:

forming a single or plural annular grooves on the inner periphery of the stopper ring, fitting a brazing filler material in the annular groove or grooves, fitting on the spigot of the pipe the stopper ring with the annular groove or grooves in which is fitted the brazing filler material, and subsequently ferritically annealing the pipe and brazing the stopper ring to the spigot under the heat of annealing.

According to this method, the brazing filler material is melted by the heat of ferritically annealing of the cast iron pipe and the melt of the material flows into the clearance between the pipe and the stopper ring and, as a result of expansion of the pipe due to transformation of the metal structure involved, the interface between the pipe and the stopper ring is subjected to pressure, so that the pipe and the stopper ring are integrally joined face to face through a brazing filler material film. Thus, the pipe is ferritically annealed and the stopper ring can simultaneously be fixed to the outer periphery of the spigot without groove cutting or welding being required with respect to the outer periphery of the pipe spigot.

DESCRIPTION OF THE EMBODIMENTS

Figure 6:
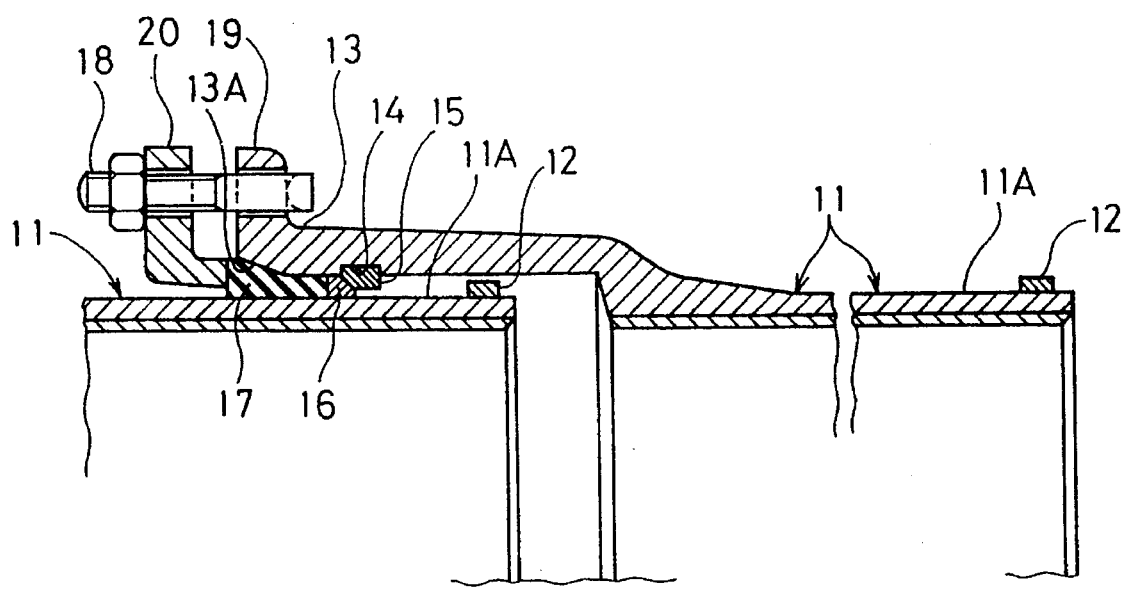
FIG. 6 is a sectional view of a pipe joint to which the stopper ring fixing method of the invention is applied.

In FIG. 6, there is shown cast iron-made pipes 11 connected together such that a socket 13 formed at an end of one of the pipes 11 has received therein a spigot 11A formed at an end of the other pipe 11. A stopper ring 12 made of steel or tough cast iron (e.g., ductile cast iron) is securely fixed to the outer periphery of a forward end of the spigot 11A. A circumferentially one-point split type lock ring 15 is fitted in an annular groove 14 formed on the inner periphery of the socket 13 at a position closer to the open end thereof than to the stopper ring 12 of the inserted spigot 11A. The stopper ring 12 is engageable with the lock ring 15 so that when they are in engagement with each other, the socket 13 and spigot 11A are prevented from separating from each other at a joint portion of the pipes 11, 11.

A sealant abutment surface 13A is formed on the inner periphery of the socket 13 at a position closer to the open end of the socket than the lock ring 15, with a rubber-made annular sealant 17 mounted between the sealant abutment surface 13A and the outer periphery of the spigot 11A. A portion of the sealant 17 at the internal side of the socket is backed up by a back-up ring 16 engageable with the lock ring 19. Sealant 17, fitted on the spigot 11A side pipe is compressed by a pusher ring 20 fastened by a bolt and nut 18 to a flange 19 at the open end of the socket 13, whereby the sealant 17 is enabled to perform the required sealing function.

Nextly, the method for fixing the stop ring 12 to the outer periphery of the spigot 11A will be explained.

Figure 1A:
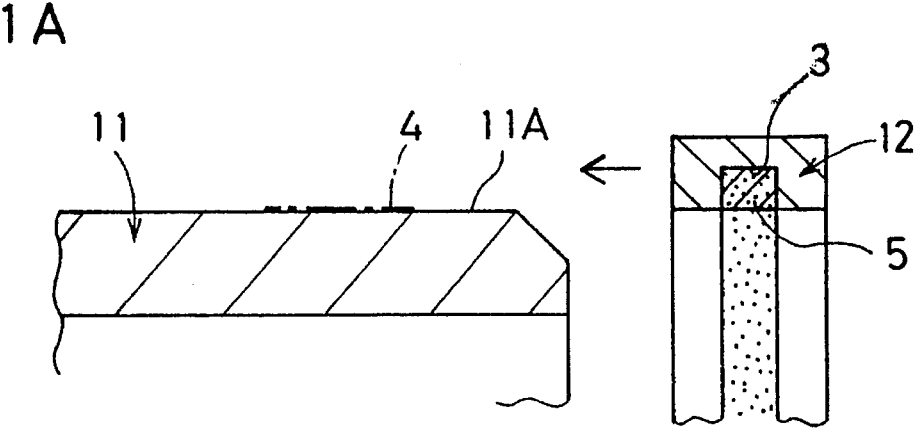
FIGS. 1A to 1C are views illustrating a stopper-ring fixing method representing one embodiment of the invention.
Figure 1B:
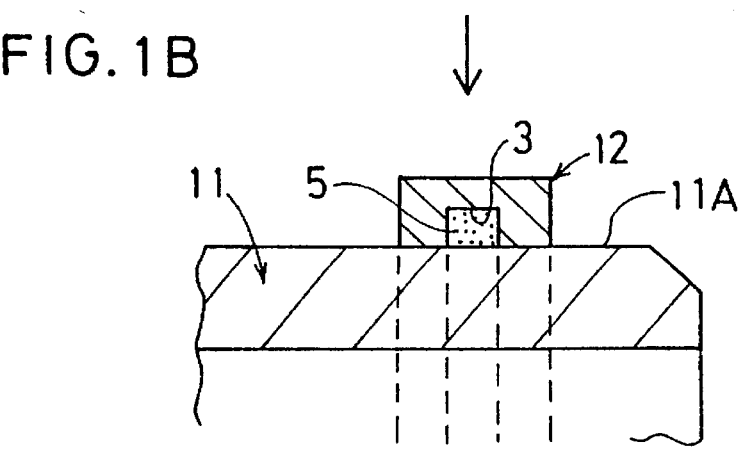

As FIG. 1A shows, flux 4, such as borax or boric acid, is applied on the outer periphery of the spigot 11A of an as-cast iron pipe 11. An annular groove 3 having a rectangular shape in cross section is formed on the inner periphery of the stopper ring 12, and a ring-shaped brazing filler material 5 is fitted in the annular groove 3. The brazing filler material 5 is also configured to be rectangular in cross section in corresponding relation to the annular groove 3. As shown in FIG. 1B, the stopper ring 12 is fitted on that portion of the spigot 11A to which is applied flux 4. A hydraulic jack or the like is used in connection with this fitting operation.

Figure 1C:
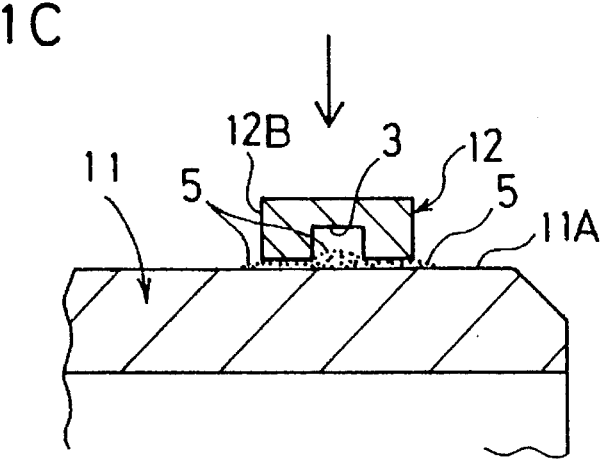

Then, the cast iron pipe 11 with the stopper ring 12 fitted on the spigot 11A is transported to an annealing furnace in which ferritic annealing is carried out to decompose the cementite structure of the pipe. Simultaneously therewith, the brazing filler material 5 melts under heat due to annealing and begins to flow into the clearance between the inner periphery of the stopper ring 12 and the outer periphery of the cast iron pipe 11, as shown in FIG. 1C. At this point of time, the cast iron pipe 11 expands due to a metallographic transformation resulting from the cementite decomposition, so that pressure is applied to the interface between the outer periphery of the cast iron pipe 11 and the inner periphery of the stopper ring 12. As a result, when the cast iron pipe 11 is removed from the annealing furnace and cooled to allow the brazing filler material to solidify, the stopper ring 12 is surely bonded and fixed to the outer periphery of the spigot 11A of the pipe 11 through a film of the brazing filler material.

In some cases, the brazing filler material 5 may protrude onto the outer periphery of the spigot 11A. Even in such a case, a surface 12B abutting the lock ring on the socket side is kept in a proper condition with no trouble resulting therefrom.

Nextly, a specific example will be given. A stopper ring 12 made of rolled steel for general structure as prescribed in Japanese Industrial Standards was fitted on an unannealed pipe 11 made of cast iron having a bore of 100 mm and an outer diameter of 116 mm, in the above described manner. The stopper ring 12 had an outer diameter of 136 mm, an inner diameter of 116 mm or even with the outer diameter of the pipe 11, and a width of 15 mm, with an annular groove 3 of 7 mm in width formed on its inner periphery. A ring-shaped brazing filler material 5 formed of nickel solder was fitted in the annular groove 3. The brazing filler material 5 had an inner diameter 1 mm or so smaller than that of the stopper ring 12.

The pipe 11 with the stopper ring 12 fitted thereon in this manner was delivered to a rolling annealing furnace exclusive for pipe use, in which ferritic annealing was exclusive for pipe use, in which ferritic annealing was effected. For this process of ferritic annealing, a first stage graphitization annealing (at 920°–980° C., 20 min., for example) for cementite decomposition, and a second stage graphitization annealing (at 730° C., 60 min., for example) for perlite decomposition and ferritization were carried out in one heating and cooling cycle.

After completion of cast iron pipe 11 annealing, the joined fixing portion of the stopper ring 12 was cut thicknesswise, and a microscopic observation was made with a cut section. It was then found that a brazing filler material 5 comprised of nickel was diffused over the outer periphery of the cast iron pipe 11, with only little brazing filler material 5 remaining within the annular groove 3. It was found that the outer periphery of the cast iron pipe 11 and the inner periphery of the stopper ring 12 were found as being completely bonded together through a film of brazing material 5.

Figure 2:
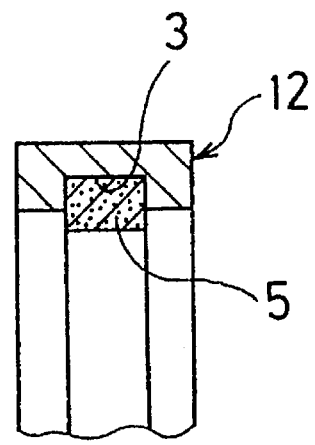
FIG. 2 is a view showing another example of brazing filler material fitting relative to the stopper ring.
Figure 3:
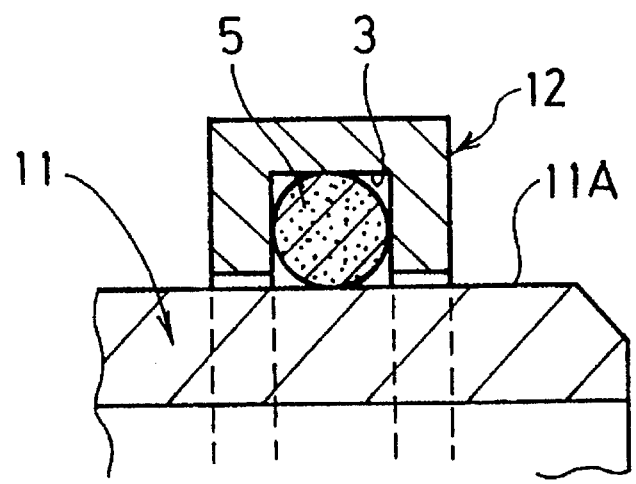
FIG. 3 is a view showing another example of brazing filler material.
Figure 4:
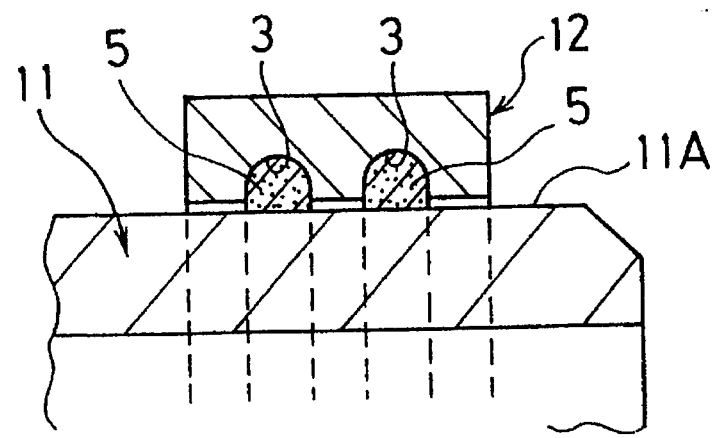
FIG. 4 is a view showing another form of stopper ring.

The stopper ring 12 may be formed of such a special steel as stainless steel. For the brazing filler material 5, silver solder, brass solder, aluminum solder, and the like may be used. As FIG. 2 shows, the brazing filler material 5 may be a ring-shaped one having a rectangular configuration in cross section which protrudes from the annular groove 3 largely toward the inner periphery side. The brazing filler material 5 may also be of a circular ring shape in cross section as shown in FIG. 3. Also, the stopper ring 12 may be of such a configuration that it has two strips of annular grooves 3 formed thereon, with a ring shaped brazing filler material 5 of semi-circular cross section fitted in each annular groove 3, as shown in FIG. 4.

Figure 5:
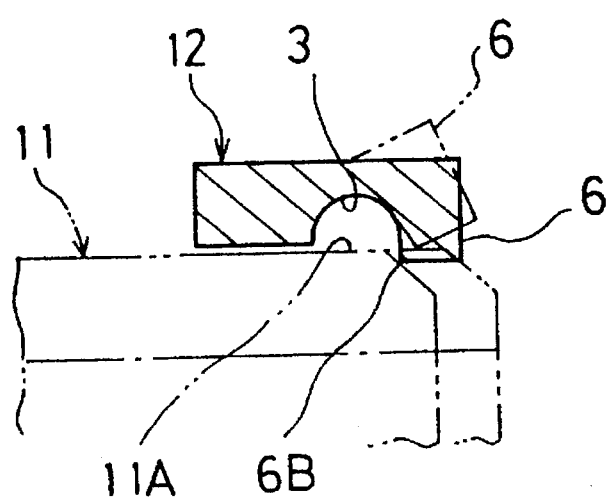
FIG. 5 is a view showing a still further form of stopper ring.

With the stopper ring 12 firmly fitted on the pipe 11, the ring 12 is prevented from being positionally offset even when the pipe 11 is rolled within the annealing furnace. In order to positively prevent such positional deviation, a configuration as shown in FIG. 5 may be employed. The stopper ring 12 shown in FIG. 5 has a positioning/fixing portion 6 smaller in inner diameter than other portion of the ring which is located on the inner periphery of its end at the pipe end side. Since the stopper ring 12 is thinner-walled at the annular groove 3 portion thereof, the positioning/fixing portion 6 will be resiliently deformed when the stopper ring 12 is fitted on the pipe 11 in such a manner that it is radially outwardly bent as shown in phantom line, thereby to hold the outer periphery of the pipe 11 with an edge portion 6B of the annular groove 3. Thus, the stopper ring 12 can be securely positioned and fixed on the outer periphery of the spigot 11A.

The present invention is not limited by the foregoing embodiment, and details of the arrangement may be suitably modified and changed according to the size and number of annular grooves 3, pipe bore diameter, etc. In some case, use of flux 4 may be omitted.

What is claimed is:

1. A method for fixing a stopper ring to the outer periphery of the spigot of a cast iron pipe which comprises:

forming a single or plural annular grooves on the inner periphery of the stopper ring, fitting a brazing filler material in the annular groove or grooves, fitting on the spigot of the pipe the stopper ring with the annular groove or grooves in which is fitted the brazing filler material, and subsequently ferritically annealing the pipe and brazing the stopper ring to the spigot under the heat of annealing.

2. A fixing method as defined in claim 1, wherein the brazing filler material is ring-shaped.

3. A fixing method as defined in claim 2, wherein the brazing filler material protrudes from the annular groove toward the inner peripheral side.

4. A fixing method as defined in claim 1, wherein the annular groove is of rectangular shape in cross section and the brazing filler material is also of rectangular shape in cross section so as for it to be fitted in the annular groove.

5. A fixing method as defined in claim 1, wherein the brazing filler material is of circular or semi-circular shape in cross section.

6. A fixing method as defined in claim 1, wherein the stopper ring has, on the inner periphery of one end adjacent to the pipe end, a positioning/fixing portion which is diametrically smaller than other portion, such that when the stopper ring is fitted on the pipe, the positioning/fixing portion is resiliently deformed in such a manner as to become radially outwardly bent to hold the outer periphery of the pipe.

* * * * *